United States Patent [19]

Younes

[11] Patent Number: 4,571,418

[45] Date of Patent: Feb. 18, 1986

[54] CHAR-FORMING POLYMER, MOLDABLE COMPOSITION AND METHOD

[75] Inventor: Usama E. Younes, Newtown Square, Pa.

[73] Assignee: Atlantic Richfield Company, Los Angeles, Calif.

[21] Appl. No.: 588,428

[22] Filed: Mar. 12, 1984

[51] Int. Cl.[4] .............................................. C08L 69/00
[52] U.S. Cl. ................................... 525/148; 525/175; 525/176; 525/182; 525/183; 525/205; 525/209; 525/214; 525/217; 525/218; 526/262; 526/274; 526/278; 526/286; 526/293; 526/294; 526/302; 526/303.1; 260/DIG. 24
[58] Field of Search .............. 526/274, 278, 262, 286, 526/293; 260/DIG. 24; 525/148, 175, 183, 209, 176, 182, 205, 214, 217, 218

[56] References Cited

U.S. PATENT DOCUMENTS

| 4,014,836 | 3/1977 | Kraft et al. | 526/278 |
|---|---|---|---|
| 4,035,571 | 7/1977 | Brunner et al. | 526/275 |
| 4,038,245 | 7/1977 | Reineke | 524/158 |
| 4,444,969 | 4/1984 | Younes | 526/262 |

*Primary Examiner*—Theodore E. Pertilla
*Attorney, Agent, or Firm*—Dennis M. Kozak

[57] ABSTRACT

The char residue formation of molded compositions, upon combustion, is improved by incorporating into the moldable composition a char-forming polymer containing recurring units of at least one monomer capable of undergoing tautomerization, at least one monomer capable of undergoing a nucleophilic substitution reaction by said monomer capable of undergoing tautomerization and, optionally, at least one additional copolymerizable monomer.

19 Claims, No Drawings

CHAR-FORMING POLYMER, MOLDABLE COMPOSITION AND METHOD

This invention relates to a char-forming polymer.

More specifically, this invention relates to a molding composition which incorporates the char-forming polymer and, in one of its more specific aspects to a method for increasing char residue formation of the molded composition upon combustion.

Polymers and polymer molding compositions having a reduced propensity to burn generally have halogenated materials incorporated therein. Such materials are thought to operate by inhibiting combustion in the gaseous phase adjacent to the polymer surface by the release of halogen-containing vapors at elevated temperatures. See for example, U.S. Pat. Nos. 3,700,957; 3,773,825; 3,773,367; and 3,804,885. However, the incorporation of halogenated materials often has a plasticizing effect on polymer molding compositions, particularly at the elevated temperatures accompanying a fire. Hence, the presence of such materials often deleteriously affects the structural integrity of molded products produced therefrom.

It is well known that char residue formation is beneficial in limiting combustion of organic polymers and, the benefit is generally greater for high-charring polymers. See for example U.S. Pat. No. 4,038,245 and S. K. Brauman's article: "Char-Forming Synthetic Polymers" J. Fire Retardant Chemistry Vol. 7 (August 1980) p. 119. In view of the known advantages of char residue formation upon combustion of polymers, novel char-forming polymers continue to be sought.

The present invention provides a novel char-forming polymer which is moldable or can be incorporated in molding compositions as a fire retardant additive.

According to this invention, there is provided a char-forming polymer which contains:

(A) from about 2.5 to about 50 mol percent recurring units of at least one monomer which is capable of undergoing tautomerization and has the general formula:

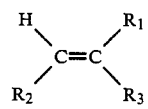

wherein $R_1$ represents a hydrogen atom or a $C_1$ to $C_5$ alkyl group; $R_2$ represents a carboxylic acid group, an amide group or a $C_1$ to $C_5$ N-mono or di substituted amide group; wherein $R_3$ represents an N-mono substituted amide group in which the substituent can be a hydrogen atom, a $C_1$ to $C_5$ alkyl group, an aryl group or an amide group; or wherein $R_2$ and $R_3$ taken together can represent an N-substituted imide linkage in which the substituent is selected from the group consisting of a hydrogen atom and an amide;

(B) from about 2.5 to about 50 mol percent recurring units of at least one monomer which is capable of undergoing a nucleophilic substitution reaction by (A) and has the general formula:

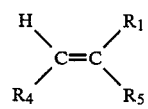

wherein $R_1$ is as defined above; $R_4$ represents a hydrogen atom; $R_5$ represents a phosphonate or substituted phosphonate group bearing a leaving group or an aryl or substituted aryl group bearing a leaving group; or wherein $R_4$ and $R_5$ taken together can represent an N-substituted imide linkage in which the substituent can be $R_5$ as defined above; and, (C) from 0 to about 95 mol percent recurring units of at least one monomer which is copolymerizable with (A) and (B), and has the general formula:

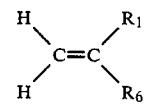

wherein $R_1$ is as defined above; $R_6$ represents an aryl or substituted aryl group or

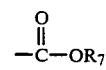

and wherein $R_7$ represents a $C_1$ to $C_{15}$ alkyl group or an aryl or substituted aryl group.

Also, according to this invention there is provided a moldable composition comprising a char-forming amount of the char-forming polymer defined above. In one embodiment of this invention, the char-forming polymer is moldable and accordingly, suitable to fabricate into molded products. In another embodiment of this invention, the char-forming polymer is utilized as a fire retardant additive and is incorporated into one or more thermoplastic resins to produce a molding compound. Any suitable thermoplastic can be employed such as for example: polycarbonate, nylon, polyethylene teraphthlate, SAN, styrene/maleic anhydride copolymer, and the like, and their mixtures.

According to this invention, there is also provided a method for increasing char residue formation on molded compositions upon combustion, which method comprises incorporating in the moldable composition a char-forming amount of the char-forming polymer defined above.

According to this invention there is also provided a method for producing a molded composition which comprises forming a molding composition comprising a char-forming polymer as defined above and molding the resulting composition.

As used herein, the word "char" is understood to mean a black, dry solid which appears upon the surface of a molded product upon combustion. The amount of char formed is measured quantitatively by determining the residual weight of the molded product after the product has been exposed to elevated temperatures. Such measurement technique is well known and called thermogravimetric analysis.

As used herein, the phrase "char-forming amount" is understood to mean the amount of char-forming polymer effective to increase the amount of char residue formed on the molded composition upon combustion as compared to the amount of char residue formed in the absence of the char-forming polymer.

As used herein, the phrase "leaving group" is understood to mean a weak base whose conjugate acid has a $pK_a$ value of less than about 5. Anions of strong acids e.g. halides and sulfonate anions, are weak bases and hence good leaving groups in nucleophilic substitution reactions.

In the practice of this invention any suitable monomer or monomer mixture capable of undergoing tautomerization can be employed as the (A) monomer. The char-forming polymer of this invention will contain from about 2.5 to about 50 total mole percent of (A) monomer. Preferably, it will contain from about 7.5 to about 50 and, most preferably, 12.5 to 50 total mol percent of (A) monomer.

Examples of particularly suitable (A) monomers are: N-carbamyl maleimide, maleamic acid, acrylamide, methacrylamide, N-carbamyl maleamic acid, n-hexyl maleamic acid, maleamic acid diamine, N-carbamyl acrylamide, N-carbamyl methacrylamide, N-methyl acrylamide, maleimide, N-phenyl methacrylamide, N-methyl maleamic acid, and N-phenyl maleamic acid and the like, and their mixtures.

In the practice of this invention, any suitable monomer or monomer mixture capable of undergoing a nucleophilic substitution reaction by (A) monomer can be employed as the (B) monomer.

The char-forming polymer of this invention will contain from about 2.5 to about 50 total mol percent of (B) monomer. Preferably, it will contain from about 7.5 to about 50, most preferably 12.5 to about 50, total mol percent of (B) monomer.

Examples of a particularly suitable (B) monomers are: dibromostyrene, monobromostyrene, tribromostyrene, bis(beta-chloroethyl)vinyl phosphonate, N-(tribromophenyl) maleimide, N-(monobromo phenyl)-maleimide, N-(dibromo phenyl) maleimide, tosyl styrene, mesyl styrene, dibromo α-methyl styrene, dibromo methyl styrene, bis(beta-bromoethyl) vinyl phosphonate, N-(tosyl phenyl)maleimide, vinyl benzyl chloride, brosyl styrene, N-(chloroethyl) maleimide and the like and their mixtures. Reference is made to U.S. Pat. No. 4,035,571 which teaches several additional bis (hydrocarbyl)vinyl phosphonates suitable for use, the teaching of which are incorporated herein by reference thereto.

If employed, any suitable monomer or monomer mixture capable of copolymerizing with (A) and (B) monomers can be employed as the (C) monomer.

The char-forming random copolymer of this invention will contain from 0 up to 95 total mol percent of (C) monomer. Preferably, it will contain from 0 up to about 85, most preferably 0 up to 75 total mol percent of (C) monomer.

Examples of particularly suitable (C) monomers are: styrene, α-methyl styrene, α-ethyl strene, p-methyl styrene, t-butyl styrene, methyl acrylate, n-butyl acrylate, methyl methacrylate, n-butyl methacrylate, norbornyl acrylate, norbornyl methacrylate, phenyl acrylate, phenyl methacrylate, isobutyl methacrylate, isobornyl methacrylate and the like, and their mixtures.

The char-forming polymers of this invention can be produced using any suitable method of polymerization such as the methods described in the following examples which serve to further illustrate the production of polymers of this invention.

The molding compositions of this invention can be prepared using any conventional method of blending and can include other ingredients, such as extenders, processing aids, pigments, stabilizers, mold release agents and the like, for their conventionally employed purpose. Moreover, reinforcing fillers, in amounts sufficient to impart reinforcement, can be used, such as titanium dioxide, potassium titanate and titanate whiskers, glass flakes and fibers.

EXAMPLE 1

About 10 g of maleamic acid and about 35 g of N-(2,4,6-tribromophenyl)maleimide were dissolved in a solvent mixture of about 138 g of water and about 54 g of acetone, and the resulting solution was charged to a polymerization vessel.

Next, about 0.02 g of benzoyl peroxide initiator was introduced into the vessel and the polymerization reaction was carried out at 80° C. for about 24 hours.

The resulting copolymer was precipitated in methanol, filtered, washed and dryed under vacuum.

The copolymer was analyzed and found to contain, in weight percent, 11 maleamic acid and 89 tribromophenyl maleimide. Thermogravimetric analysis (TGA) under nitrogen found 31.5% char residue at 600° C.

EXAMPLE 2

About 1 g of N-carbamylmaleamic acid, about 1.9 g dibromostyrene and about 0.07 g zinc chloride were dissolved in about 6.8 g pyridine and the resulting solution was charged to a polymerization vessel.

Next, about 0.005 g AIBN initiator was introduced into the vessel and the polymerization reaction was carried out at 52° C. for about 24 hours.

The resulting copolymer was precipitated in methanol, filtered, washed and dried under vacuum.

The copolymer was analyzed and found to contain, in weight percent, 33 N-carbamylmaleamic acid and 67 dibromostyrene. TGA under nitrogen found 10% char residue at 600° C.

EXAMPLE 3

About 321 g of bis(beta-chloroethyl)vinyl phosphonate, about 276 g dibromostyrene and about 100 g maleimide were charged to a polymerization vessel.

Next, about 0.41 g benzoyl peroxide initiator was introduced into the vessel and the polymerization reaction was carried out at 90° C. for about 72 hours.

The resulting terpolymer was dissolved in tetrahydrofuran (THF), precipitated in methanol, filtered, washed and dried under vacuum.

The terpolymer was analyzed and found to contain, in weight, percent 10 bis(beta-chloroethyl)vinyl phosphonate, 73 dibromostyrene and 17 maleimide. The terpolymer was found to have a glass transition temperature (Tg) of 222° C. and weight average molecular weight measured by gas phase chromatography using polystyrene standards, of 140,200. TGA analysis under nitrogen found 32% char residue at 600° C.

EXAMPLE 4

About 8.9 g acrylamide and about 32.8 g of dibromostyrene were dissolved in about 132 g dimethylformamide and the resulting solution was charged to a polymerization vessel.

Next, about 0.16 g AIBN (2,2'-azobisisobutyronitrile) initiator was introduced into the vessel and the polymerization reaction was carried out at 80° C. for about 24 hours.

The resulting copolymer was precipitated in methanol, filtered, washed and dried under vacuum.

The copolymer was analyzed and found to contain, in weight, percent 21.7 acrylamide and 78.7 dibromostyrene. TGA under nitrogen found 9.5% char residue at 600° C.

EXAMPLE 5

About 10 g acrylamide and about 57.4 g N-(2,4,6-tribromophenyl)maleimide were dissolved in a solvent mixture containing about 20 g of water and 81 g of acetone and the resulting solution was charged to a polymerization vessel.

Next, about 0.03 g benzoyl peroxide initiator was introduced into the vessel and the polymerization reaction was carried out at 80° C. for about 24 hours.

The resulting copolymer was precipitated in methanol, filtered, washed and dried under vacuum.

The copolymer was analyzed and found to contain, in weight percent, 12.8 acrylamide and 87.2 tribromophenyl maleimide. TGA under nitrogen found 6.5% char residue at 600° C.

EXAMPLE 6

About 10 g N-carbamylmaleamic acid and about 26.2 g N(2,4,6-tribromophenyl)maleimide were dissolved in a solvent mixture containing about 10.8 g of water and about 43.5 g of acetone and the resulting solution was charged to a polymerization vessel.

Next, about 0.02 g benzoyl peroxide initiator was introduced into the vessel and the polymerization reaction was carried out at 80° C. for about 24 hours.

The resulting copolymer was precipitated in methanol, filtered, washed and dried under vacuum.

The copolymer was analyzed and found to contain, in weight percent, 47% N-carbanylmaleamic acid and 53% tribromophenyl maleimide. TGA under nitrogen found 15.5% char residue at 600° C.

EXAMPLE 7

About 10 g maleamic acid and about 20.2 g bis(beta-chloroethyl)vinyl phosphonate were dissolved in a solvent mixture containing about 9 g water and about 36.3 g acetone, and the resulting solution was charged to a polymerization vessel.

Next, about 0.02 g benzoyl peroxide initiator was introduced into the vessel and the polymerization reaction was carried out at 80° C. for about 24 hours.

The resulting copolymer was recovered by precipitation from methanol and was filtered, washed and dried under vacuum.

The recovered copolymer was analyzed and found to contain in weight percent 90.6 maleamic acid and 3.4 bis(beta-chloroethyl)vinyl phosphonate. TGA under nitrogen found 22.5% char residue at 600° C.

EXAMPLE 8

To a one pint citrate bottle were charged about 4.3 g styrene, about 10.9 g dibromostyrene, about 8.0 g of maleimide and about 69.9 g of methyl ethyl ketone, with agitation.

Next 0.008 g benzyl peroxide initiator was added to the contents of the citrate bottle.

The citrate bottle was flushed with nitrogen, placed into an oil bath, set at a temperature of about 95° C. and the bottle contents agitated occasionally. The polymerization reaction was carried out for about 2½ hours.

The resulting terpolymer was dissolved in tetrahydrofuran and precipitated in methanol, filtered, washed and dried under vacuum.

The terpolymer was found to contain, in weight percent, 24 styrene, 26 maleimide and 50 dibromostyrene. Analysis of the terpolymer found a glass transition temperture of 240° C. and a weight average molecular weight measured by gas chromatography using polystyrene standards, of 232,000. TGA under nitrogen found that the terpolymer yielded 23% char at 800° C.

EXAMPLE 9

To a one pint citrate bottle were charged about 9.3 g styrene, about 3.9 g dibromostyrene, about 10.1 g of maleimide and about 69.6 of methyl ethyl ketone, with agitation.

Next about 0.008 g of benzyl peroxide initiator was added to the contents of the citrate bottle.

The citrate bottle was flushed with nitrogen, placed into an oil bath, set at a temperature of about 95° C. and the bottle contents agitated occasionally. The polymerization reaction was carried out for about 2½ hours.

The resulting terpolymer was dissolved in tetrahydrofuran and precipitated in methanol, filtered, washed and dried under vacuum.

The terpolymer was found to contain, in weight percent, 45 styrene, 40 maleimide and 15 dibromostyrene. Analysis of the terpolymer found a glass transition temperature of 225° C. and weight average molecular weight, measured by gas phase chromotography using polystyrene standards, of 232,000. TGA under nitrogen found that the terpolymer yield 19% char at 600° C.

EXAMPLE 10

To a one pint citrate bottle were charged about 63 g styrene, about 24.5 g dibromostyrene, about 50 g of acrylamide and about 91.5 g of disobutyl ketone, with agitation.

Next about 0.17 g of benzoyl peroxide initiator was added to the contents of the citrate bottle.

The citrate bottle was flushed with nitrogen, placed into an oil bath, set at a temperature of about 95° C. and the bottle contents agitated occasionally. The polymerization reaction was carried out for about 2½ hours.

The resulting solution was filtered and the resulting terpolymer was washed in ether and dried under vacuum.

Analysis of the terpolymer found a glass transition temperatures of 128° C. and 189° C. TGA under nitrogen found that the terpolymer yielded 10% char at 600° C.

EXAMPLE 11

Three moldable compositions (A, B and C) were prepared using the terpolymer prepared in Example 3. All three compositions were prepared by mixing at a temperature of about 500° F. using a Brabender mixer.

Composition A contained 90 parts by weight of Zytel ®151 nylon (E. I. DuPont de Nemours Co.) and 10 parts by weight of the bis(beta-chloroethyl)vinyl phosphonate/dibromostyrene/maleimide terpolymer prepared in Example 3.

Composition B contained 90 parts by weight of Cleartuf ®7202 polyethylene terephthlate Goodyear Tire & Rubber Co. and 10 parts by weight of the terpolymer prepared in Example 3.

Composition C contained 90 parts by weight of Lexan 141 polycarbonate (General Electric Company) and 10 parts by weight of the terpolymer prepared in Example 3.

Each molding composition was separately compression molded into ⅛ inch thick samples which were tested and found to exhibit LOI, limiting oxygen index, (%O$_2$) values of 24, 27, and 34 respectively.

It will be evident from the foregoing that various modifications can be made to this invention. Such, however, are considered as being within the scope of the invention.

What is claimed is:

1. A char-forming polymer which consists essentially of:
(A) from about 2.5 to about 50 mol percent recurring units of at least one monomer which is capable of undergoing tautomerization and has the general formula:

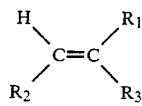

wherein $R_1$ represents a hydrogen atom, or a $C_1$ to $C_5$ alkyl group; $R_2$ represents a carboxylic acid group, and amide group or a $C_1$ to $C_5$ N-mono-or di-substituted amide group; and, wherein $R_3$ represents an N mono-substituted amide group in which the substituent can be a hydrogen atom, a $C_1$ to $C_5$ alkyl group, an aryl group or an amide group;

(B) from about 2.5 to about 50 mol percent recurring units of at least one monomer which is capable of undergoing a nucleophilic substitution reaction by (A) and has the general formula:

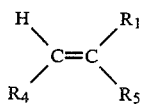

wherein $R_1$, is as defined above; $R_4$ represents a hydrogen atom; and, $R_5$ represents a phosphonate or substituted phosphonate group bearing a leaving group or an aryl or substituted aryl group bearing a leaving group; and (C) from about 0 to about 95 mol percent recurring units of at least one monomer which is copolymerizable with (A) and (B) and has the general formula:

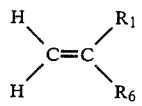

wherein $R_1$ is as defined above; $R_6$ represents an aryl or substituted aryl group or

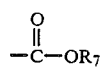

and wherein $R_7$ represents a $C_1$ to $C_{15}$ alkyl group or an aryl or substituted aryl group.

2. The char-forming polymer of claim 1 in which in the general formula for said (A) monomer, $R_2$ and $R_3$ taken together represent an N-substituted imide linkage, in which the substituent is a hydrogen atom or an amide group with the proviso, that if $R_2$ and $R_3$ taken together represent a maleimide linkage, then (B) monomer cannot solely be a vinyl phosphonate monomer.

3. The char-forming polymer of claim 1 or 2 in which in the general formula for said (B) monomer $R_4$ and $R_5$ taken together represent an N-substituted imide linkage, wherein the substituent on the imide linkage is $R_5$ as defined above.

4. The char-forming random polymer of claims 1, 2 or 3 in which said leaving group is a weak base whose conjugate acid has a $pK_a$ value of 5 or less.

5. A moldable composition comprising a thermoplastic resin and a char-forming amount of a char-forming polymer which contains:
(A) from about 2.5 to about 50 mol percent recurring units of at least one monomer which is capable of undergoing tautomerization and has the general formula:

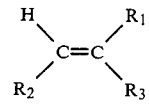

wherein $R_1$ represents a hydrogen atom, or a $C_1$ to $C_5$ alkyl group; $R_2$ represents a carboxylic acid group, and amide group or a $C_1$ to $C_5$ N-mono-or di-substituted amide group; and, wherein $R_3$ represents an N mono-substituted amide group in which the substituent can be a hydrogen atom, a $C_1$ to $C_5$ alkyl group, an aryl group or an amide group;

(B) from about 2.5 to about 50 mol percent recurring units of at least one monomer which is capable of undergoing a nucleophilic substitution reaction by (A) and has the general formula:

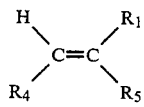

wherein $R_1$, is as defined above; $R_4$ represents a hydrogen atom; and, $R_5$ represents a phosphonate or substituted phosphonate group bearing a leaving group or an aryl or substituted aryl group bearing a leaving group; and (C) from about 0 to about 95 mol percent recurring units of at least one monomer which is copolymerizable with (A) and (B) and has the general formula:

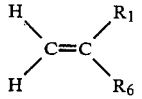

wherein $R_1$ is as defined above; $R_6$ represents an aryl or substituted aryl group or

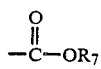

and wherein $R_7$ represents a $C_1$ to $C_{15}$ alkyl group or an aryl or substituted aryl group.

6. The molding composition of claim 5 in which in the general formula for said (A) monomer, $R_2$ and $R_3$ taken together represent an N-substituted imide linkage, in which the substituent is a hydrogen atom or an amide group with the proviso, if $R_2$ and $R_3$ taken together represent a maleimide linkage then (B) monomer cannot solely be a vinyl phosphonate monomer.

7. The molding composition of claims 5 or 6 in which in the general formula for said (B) monomer, $R_4$ and $R_5$ taken together represent an N-substituted imide linkage wherein the substituent on the imide linkage is $R_5$ as defined above.

8. The molding composition of claim 5 in which said thermoplastic resin is polycarbonate.

9. The molding composition of claim 5 in which said thermoplastic resin is nylon.

10. The molding composition of claim 5 in which said thermoplastic resin is polyethylene terephthlate.

11. The molding composition of claim 5 in which said thermoplastic resin is styrene/maleic anhydride.

12. The molding composition of claim 5 in which said thermoplastic resin is styrene/acrylonitrile.

13. A method for increasing the char residue formation of molded compositions upon combustion which method comprises incorporating into the molding composition before molding a char-forming amount of the char-forming polymer of claim 1.

14. A method for increasing the char residue formation of molded compositions upon combustion which method comprises incorporating into the molding composition before molding a char-forming amount of the char-forming polymer of claim 2.

15. A method for increasing the char residue formation of molded compositions upon combustion which method comprises incorporating into the molding composition before molding, a char-forming amount of the char-forming polymer of claim 3.

16. A method for producing a molded composition which comprises forming a molding composition which comprises a char-forming amount of the char-forming polymer of claim 1 and molding the resulting composition.

17. A method for producing a molded composition which comprises forming a molding composition which comprises a char-forming amount of the char-forming polymer of claim 2 and molding the resulting composition.

18. A method for producing a molded composition which comprises forming a molding composition which comprises a char-forming amount of the char-forming polymer of claim 3 and molding the resulting composition.

19. A char forming polymer which consists essentially of:

(A) from about 2.5 to about 50 mol percent recurring units of a monomer which is capable of undergoing tautomerization selected from the group consisting of: N-carbamyl maleimide, maleamic acid, acrylamide, methacrylamide N-carbamyl maleamic acid, n-hexyl maleamic acid, maleamic acid diamine, N-carbamyl acrylamide, N-carbamyl methacrylamide, N-methyl acrylamide, maleimide, N-phenyl methacrylamide, N-methyl maleamic acid, and N-phenyl maleamic acid;

(B) from about 2.5 to about 50 mol percent recurring units of a monomer which is capable of undergoing a neuclophilic substitution reaction by (A) and selected from the group consisting of: dibromostyrene, monobromostyrene, tribromostyrene, bis(beta-chloroethyl) vinyl phosphonate, N-(Tribromophenyl)maleimide, N-monobromo phenyl)malemide, N-(dibromo phenyl)maleimide, tosyl styrene, mesyl styrene, dibromo α-methyl styrene, dibromo methyl styrene, bis(beta-bromoethyl) vinyl phosphonate, N-(tosyl phenyl)maleimide, vinyl benzyl chloride, brosyl styrene, and N-chloroethyl)maleimide; and (C) from about 0 to about 95 mole percent recurring units of a monomer which is copolymerizable with (A) and (B) and is selected from the group consisting of: styrene, α-methyl styrene, α-ethyl styrene, p-methyl styrene, t-butyl styrene, methyl acrylate, n-butyl acrylate, methyl methacrylate, n-butyl methacrylate, norbornyl acrylate, norbornyl methacrylate, phenyl acrylate, phenyl methacrylate, isobutyl methacrylate and isobornyl methacrylate;

with the proviso that if (A) is either N-carbamyl maleimide or maleimide then (B) cannot solely be a vinyl phosphonate monomer.

* * * * *